March 2, 1926.  1,574,753

F. BONNET

MACHINE FOR MOLDING BUILDING BLOCKS AND THE LIKE

Filed April 29, 1924  2 Sheets-Sheet 1

Inventor:
François Bonnet

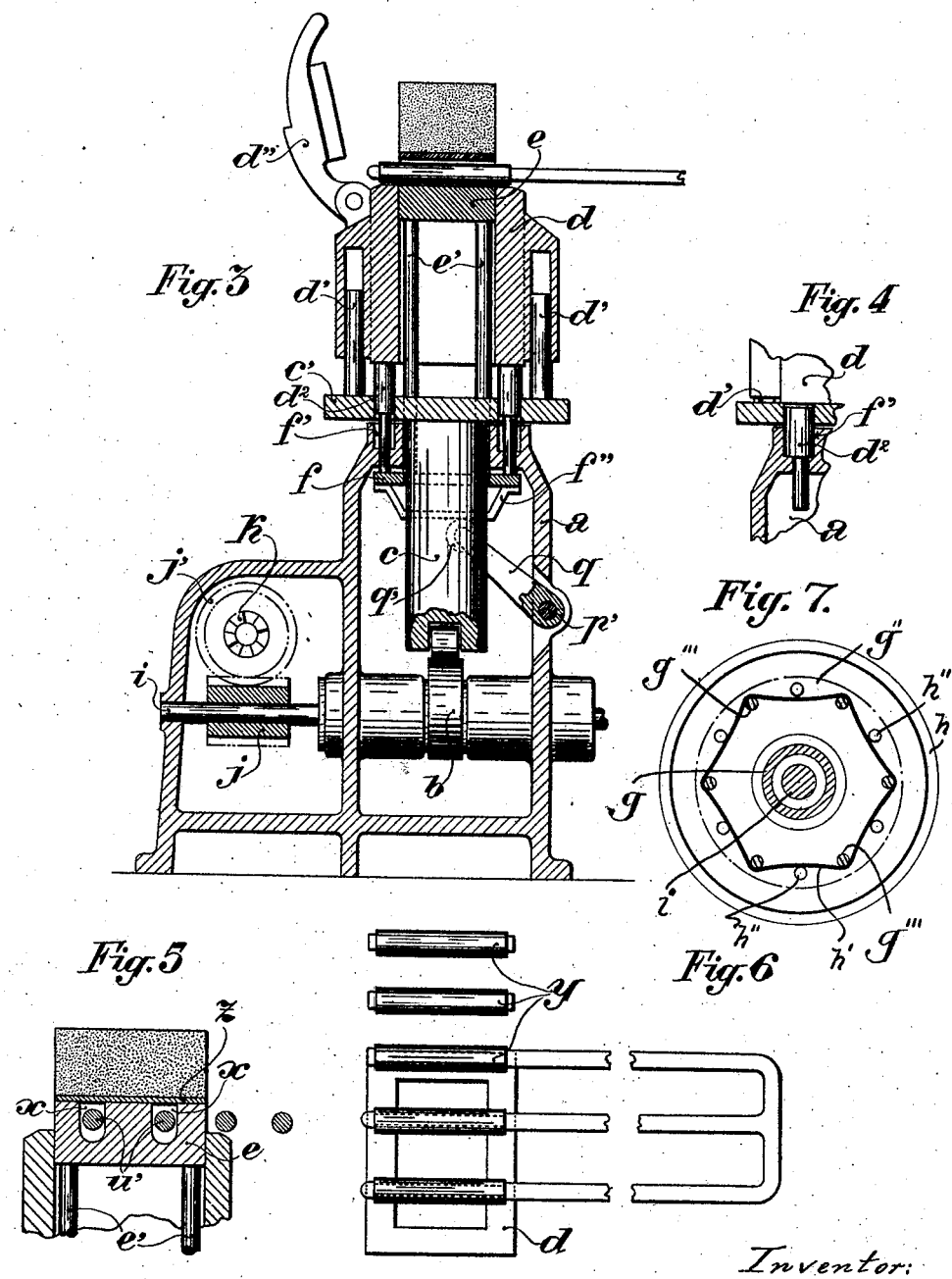

Patented Mar. 2, 1926.

1,574,753

UNITED STATES PATENT OFFICE.

FRANÇOIS BONNET, OF VILLEFRANCHE-SUR-SAONE, FRANCE.

MACHINE FOR MOLDING BUILDING BLOCKS AND THE LIKE.

Application filed April 29, 1924. Serial No. 709,869.

*To all whom it may concern:*

Be it known that I, FRANÇOIS BONNET, a citizen of the French Republic, residing at Villefranche-sur-Saone, Rhone, France, have invented certain new and useful Improvements in Machines for Molding Building Blocks and the like, of which the following is a specification.

Machines for molding concrete and like blocks at present in operation, wherein the pressure exerted on the material is obtained mechanically by ramming it into a mold mounted on a fixed plate yield, from the manufacturing point of view, remarkable results, but the extrication of the molded block requires laborious manipulation by hand involving appreciable loss of time.

The automatic apparatus for the ejection of molded blocks which constitutes the subject matter of this invention avoids the drawbacks of extrication by hand and permits of a marked increase in output, while simultaneously conducing to greater facility and evenness in operation.

The apparatus is characterized by the combination of the two following mechanical movements:

1. Automatic ejection of the molded block by the vertical displacement of an ejector plate or disc operated by lever and rod mechanism which is actuated by a crank disc as it completes a rotation under the influence of suitable actuating mechanism.

2. The projection of a roller-support beneath the molded block so as to allow of its removal after quitting the ejector plate, this projection movement being obtained by mechanism comprising levers and rods actuated at the exact moment of ejection of the molded block.

The annexed drawing illustrates an example of construction of the invention.

Fig. 3 is a vertical longitudinal section of the machine, the members of which are in positions corresponding to the moment of maximum ejection.

Fig. 4 is a detail view showing the position of a column for elevating the mold after compression of the material.

Fig. 5 is a transverse view through the upper part of the mold at the moment when the roller support has begun to grip the molded material from below.

Fig. 6 is a plan view showing the rollers arranged above the mold for the liberation of the blocks when molded.

Fig. 7 is a detail view showing the mounting of the parts of a driving connection involved.

The molding machine on which the ejector apparatus is shown is of the known type.

This machine comprises a body or frame $a$ within which works vertically, under the influence of a cam $b$, a piston $c$ which terminates in a plate $c'$ on which rests a mold $d$ and a movable base $e$. The mold $d$ which is secured centrally on the plate $c'$ by guides $d'$ is stopped at its upper extremity by the cover $d''$ which is provided with the usual locking device.

A slide block $f$ effects the raising of the movable base $e$ by means of the pillars $e'$ and the re-raising of the mold $d$ by means of the pillars $d^2$ which constitute buttresses and are housed in the recesses $f'$ made in the upper part of the frame $a$.

The mechanism which controls the ramming of the mold consists of a hollow shaft $g$ turning in the bushes $g'$ which are fitted in the openings $a'$ of the frame $a$ of the machine. Between the openings is arranged the compression cam $b$ which is integral with the hollow spindle $g$ the rotation of which is effected by automatic engaging means consisting of a disc $g''$ whose driving pins $g'''$ are connected by a belt $h'$ to the similar pins $h''$ of a driving pulley $h$. The two sets of pins are disposed in alternating or staggered relation to each other, and the belt is here shown as passing under the pins $h''$ on the pulley $h$ and under the pins $g'''$ on the disc, so to speak, so that the pins $h''$ act directly on the belt during the rotation of the pulley and the belt, in turn, acts directly on the pins $g'''$, the belt thus constituting an elastic connection between the pulley and the disc.

The block ejecting apparatus comprises a shaft $i$ secured centrally within the hollow shaft $g$ by roller bearings $i'$. To one end of the shaft $i$ is keyed a driving pulley $i''$ while the other extremity, mounted centrally in the frame $a$ carries a worm $j$ which actuates a worm wheel $j'$ the spindle $j''$ of which turns in a bearing $a''$ in the frame $a$.

The front face of the wheel $j'$ comprises a female clutch $k$ with which can engage a male clutch $k'$ formed on the extremity of a collar $k''$ which is pressed forward on a shaft $l$ by a spring $l'$. The collar $k''$ carries a sloped bearing ring $m$ which can bear on a pin $m'$, the latter being again pulled downwards by a finger $m''$ which forms an integral part of a lever $n$ subject to the tension of a spring $n'$ (Fig. 1).

To the outer extremity of the shaft $l$ is keyed a crank disc $o$ carrying an axle pin $o'$ placed eccentrically and actuating a rod $p$ which turns a spindle $p'$ by the means of a lever $p''$. The spindle $p'$ causes the rocking of a lever $q$ integral with it, the two branches of which are provided with rollers $q'$ on which rest the stirrups $f''$ secured to the underside of the slide block $f$ and on either side of the piston $c$ (Fig. 3).

Figure 1:
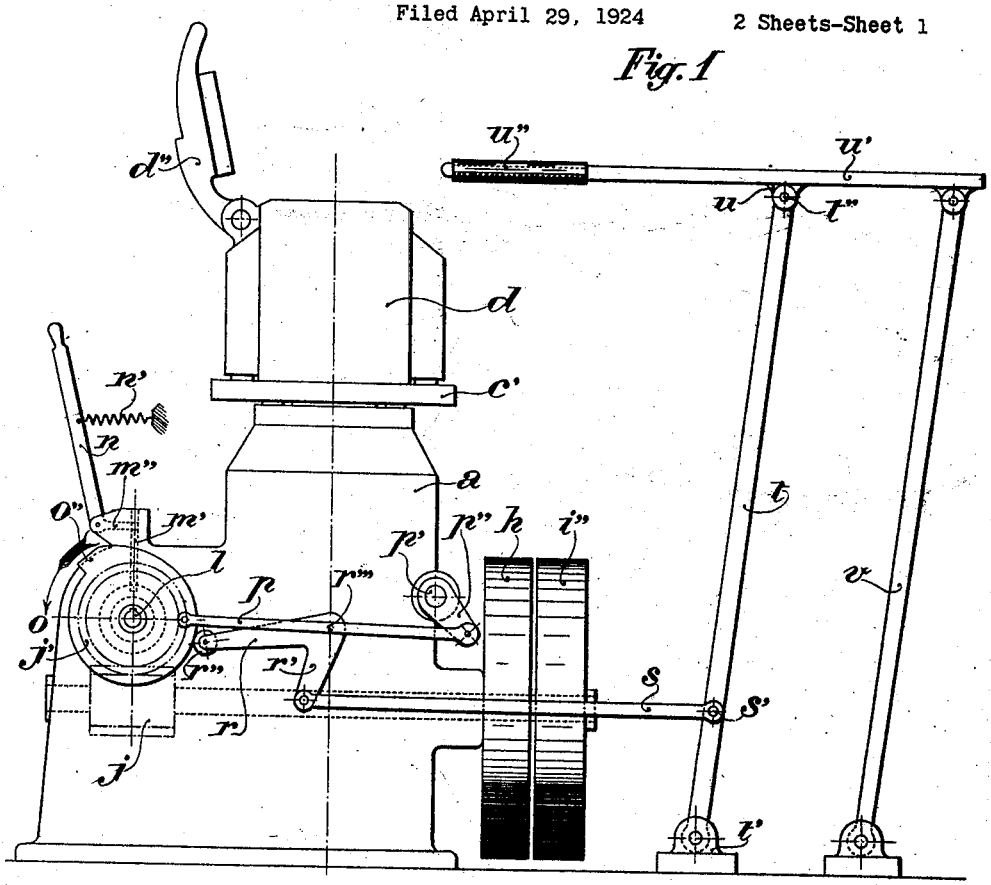
Fig. 1 represents a front view of the exterior of a molding machine, when idle and provided with the ejection apparatus.
Figure 2:
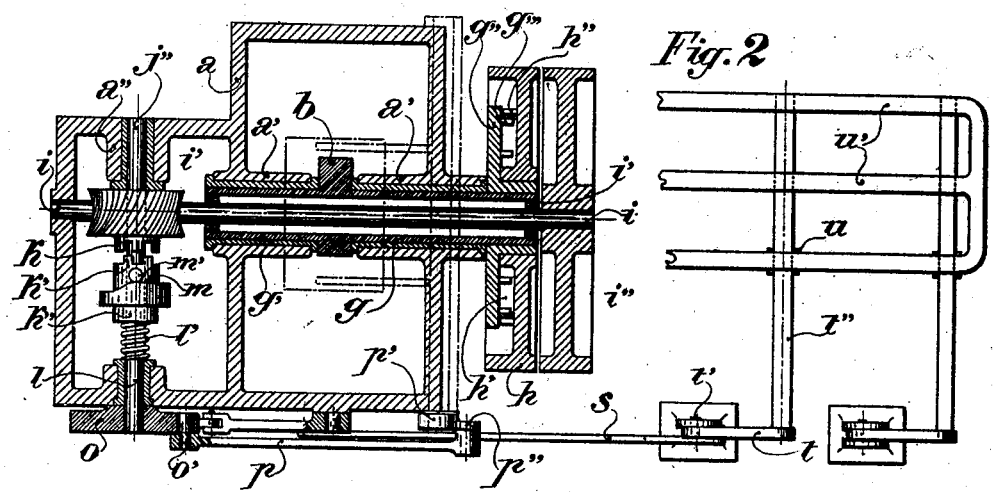
Fig. 2 is a section on line A B C of Fig. 1.

On the periphery of the crank disc $o$ is a cam $o''$, Fig. 1, which produces abrupt rocking of a double-armed lever $r$, $r'$ provided with a friction roller $r''$ and pivotally mounted on a fixed axis $r'''$ (Fig. 1). The arm $r'$ of the lever actuates a rod $s$ which is connected by a pin $s'$ to a vertical rod $t$ which, at its foot, can rock in a support $t'$ and is, at its upper extremity, pivoted on an axle $t''$ mounted in cheeks $u$ integral with the bar $u'$. At the front end of each bar $u'$ is mounted a tube or roller $u''$ while their rear extremities are supported on rods $v$ mounted in the same manner as rods $u$ and forming with the latter a jointed parallelogram.

The movable ejector base $e$ (Fig. 5) is provided in its upper part with two longitudinal recesses $x$ and which forms means for engaging the bars $u'$.

Lastly, a roller track comprising the rollers $y$ is arranged behind the mold $d$ to receive the molded blocks as they are produced.

The operation of the molding machine is as usual with respect to the compression of the substance in the mold. This first operation is effected by the pulley $h$ which actuates the hollow spindle $g$ and produces rotation of the cam $b$. When the compression is finished and the mold $d$ has come to rest on the plate $c'$ of the piston, the workman produces disengagement by causing the driving belt to pass from the pulley $h$ to the pulley $i''$ and the plate $c'$ thus becomes stationary and it is easy to lift the cover of the mold after disengaging the locking device.

The extrication of the molded product is effected at this moment by simply exerting a push on the lever $n$ in the direction of the arrow; the pulley $i''$ when driven by the belt causing the rotation of the central shaft $i$ and consequently also of the worm $j$ and the worm wheel $j'$.

Reversal of the lever $n$ lifts the pin $m'$ which thus clears the slope of the ring $m$ and permits the clutch member $k''$ by the push of the spring $l'$ to engage with the clutch member $k$. The result is that the shaft $l$ is actuated and rotates quickly through one turn only as the pin $m'$ being pushed by the spring $n'$ falls back into the receding portion of the slope $m$ which is carried to the rear when the boss returns into contact with the axis $m'$. At this moment the parts $m'$ and $k'$ are again disengaged and the shaft $l$ becomes stationary.

This single revolution of the crank disc $o$ integral with the shaft $l$ produces, by means of the rod $p$ and the levers $p''$ and $q$ an ascending and descending movement of the slide block $f$. As it ascends the block $f$ first raises, by means of the pillars $e'$ the movable base $e$ on which the molded block rests and then towards the end of its movement, it pushes the mold $d$ by means of the small pillars $d^2$.

Exactly at the moment when the crank disc $o$ has executed a half rotation and the base $e$ has reached its maximum elevation, the cam $c''$ which has been displaced in the direction of the arrow (Fig. 1) meets the roller $r''$ of the lever $r$ and causes it to rock. The result is to move abruptly forward the bars $u'$, and to cause them to engage in the grooves $x$ of the movable base $e$ below the plate $z$ which carries the molded block, which is thus held above the mold $d$ in spite of the immediate descent of the base $e$. All that is then required is to push the molded block on to the roller way $y$ when it is carried away from the machine.

The workman now pushes back the bars $u'$, refills the mold $d$ and after closing the cover $d''$, puts the pulley $h$ into engagement and commences another molding operation.

What I claim as my invention and desire to secure by Letters Patent of the United States is:—

1. In a molding apparatus of the character described, an ejector plate for the molded block, a crank disc, means for rotating said crank disc, means for governing the rotation of said crank disc, means operated by said crank disc for raising said ejector plate and thereby said block from the molding box of the apparatus, recesses in the upper surface of said ejector plate, rollers adapted to rotate in said recesses and means for introducing said rollers into said recesses or withdrawing them therefrom.

2. In a molding apparatus of the character described, a shaft, a driving pulley mounted at one extremity thereof, a worm on said shaft, a worm wheel gearing therewith, a crank disc, a clutch adapted to connect said crank disc to said worm wheel, means for operating said clutch, vertical guide rods connected to said ejector plate, a piston connected to said guide rods, means for guiding said rods, and lever mechanism connecting said crank disc to said piston to raise and lower the latter and thereby said ejector plate.

3. In a molding apparatus of the character described, a shaft, a driving pulley mounted at one extremity thereof, a worm on said shaft, a worm wheel gearing therewith, a crank disc, a clutch adapted to connect said crank disc to said worm wheel, means for operating said clutch, vertical guide rods connected to said ejector plate, a piston connected to said guide rods, means for guiding said rods, lever mechanism connecting said crank disc to said piston, a cam on the periphery of said crank disc, a bell crank lever rocked by said cam by the rotation of said disc, a horizontal framing, rollers carried on bars of said framing and means operated by said bell crank lever adapted to introduce said rollers into recesses in the upper surface of the ejector plate or withdraw them therefrom.

In witness whereof I have signed this specification.

FRANÇOIS BONNET.